United States Patent [19]
Cecchetti

[11] Patent Number: 4,949,498
[45] Date of Patent: Aug. 21, 1990

[54] FISHING ROD HOLDER SUPPORT DEVICE

[76] Inventor: Alfred E. Cecchetti, 1623 Leishman Ave., Arnold, Pa. 15468

[21] Appl. No.: 328,897

[22] Filed: Mar. 27, 1989

[51] Int. Cl.⁵ .............................................. A01K 97/10
[52] U.S. Cl. ...................................... 43/21.2; 248/541
[58] Field of Search ........................... 43/21.2; 248/541

[56] References Cited

U.S. PATENT DOCUMENTS

| | | | |
|---|---|---|---|
| 635,612 | 10/1899 | Tardel | 248/541 |
| 2,459,549 | 1/1949 | Smith | 43/21.2 |
| 3,484,066 | 12/1969 | Aunspaugh | 248/541 |
| 4,565,025 | 1/1986 | Behrle | 43/21.2 |
| 4,694,603 | 9/1987 | Anderson | 43/21.2 |
| 4,763,435 | 8/1988 | Deering | 43/21.2 |

FOREIGN PATENT DOCUMENTS 1394573  5/1975  United Kingdom ................. 43/21.2

Primary Examiner—Kurt Rowan
Attorney, Agent, or Firm—Clifford A. Poff

[57] ABSTRACT

A device for stably supporting a conventional rod-like fishing rod holder. In a first embodiment, the device stably supports and adapts a conventional rod-like fishing rod holder to be of use on ice surfaces. In a second embodiment, the device adjustably and stably supports and adapts a conventional rod-like fishing rod holder to be of use on boat surfaces.

17 Claims, 3 Drawing Sheets

U.S. Patent   Aug. 21, 1990   Sheet 1 of 3   4,949,498
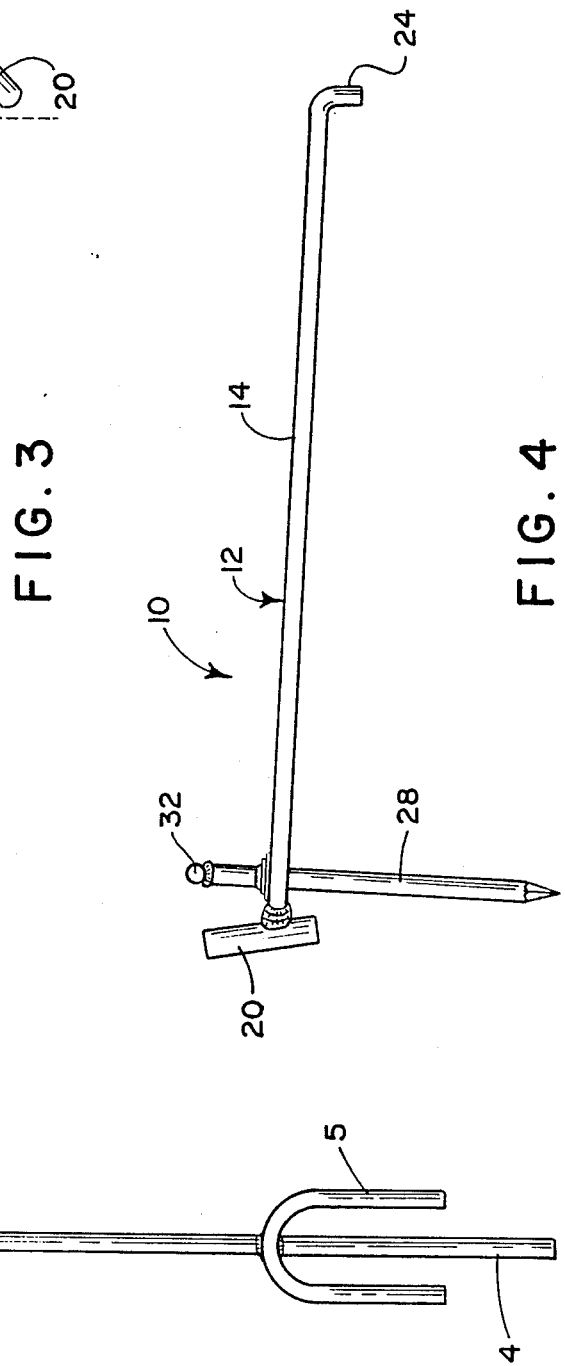
FIG. 3
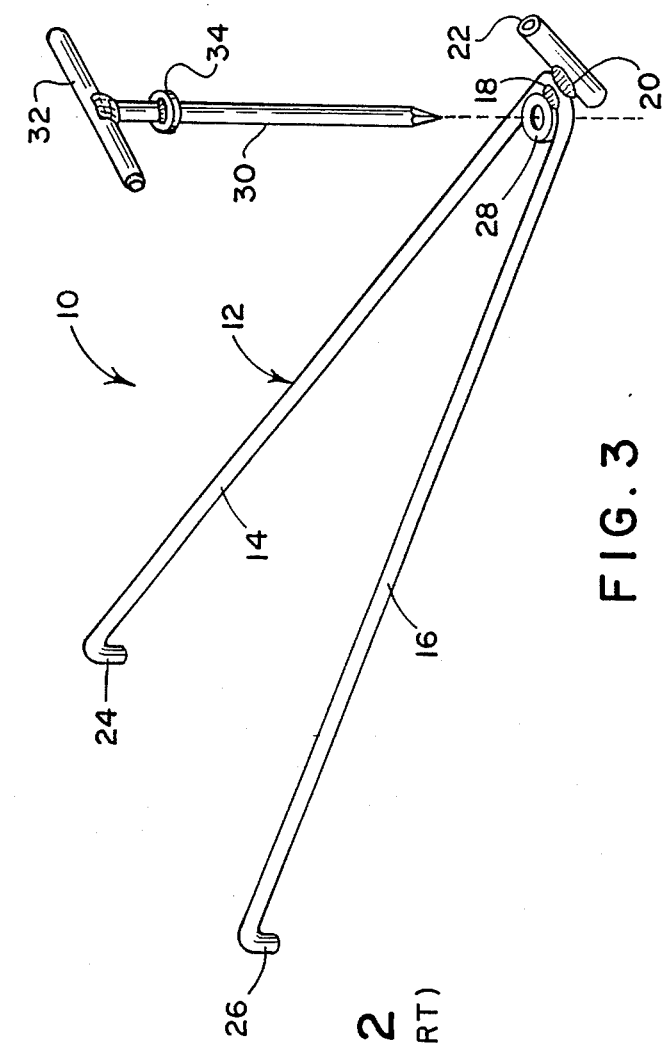
FIG. 4
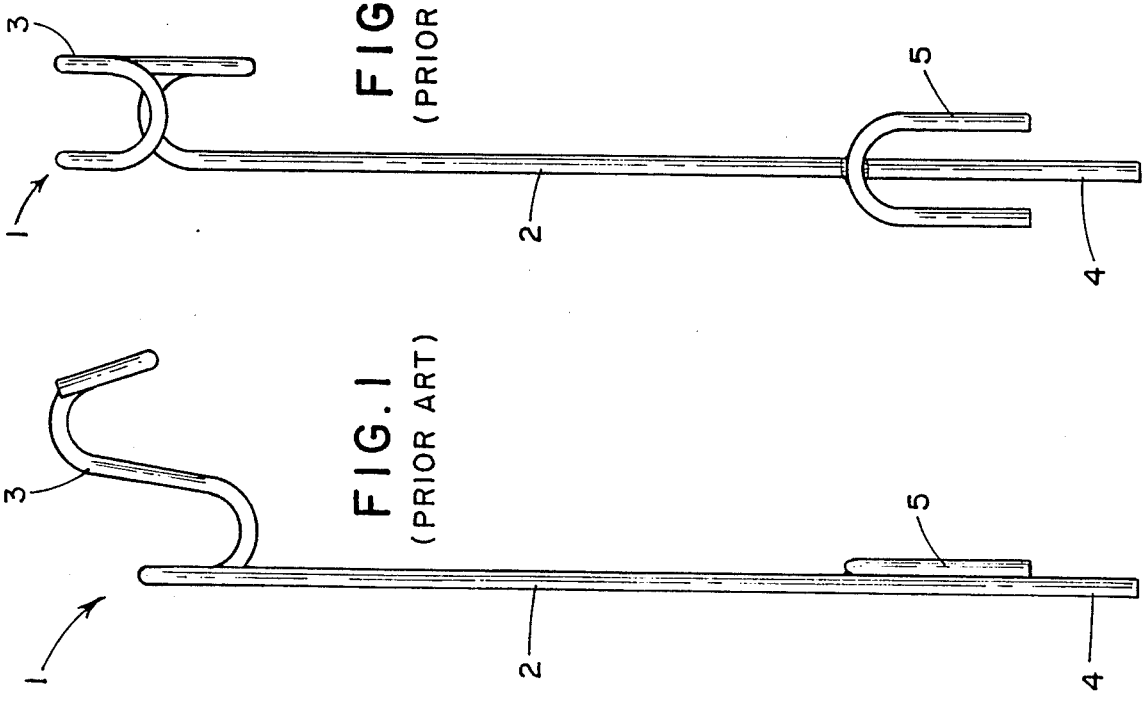
FIG. 1 (PRIOR ART)
FIG. 2 (PRIOR ART)

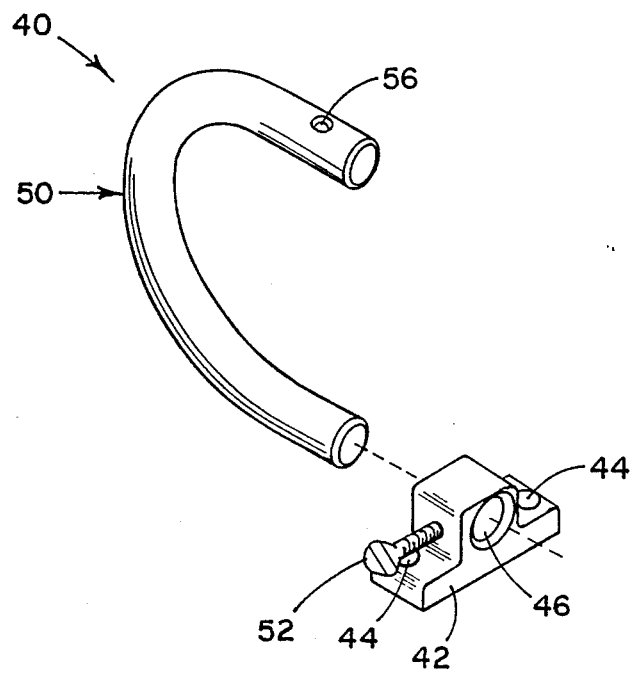
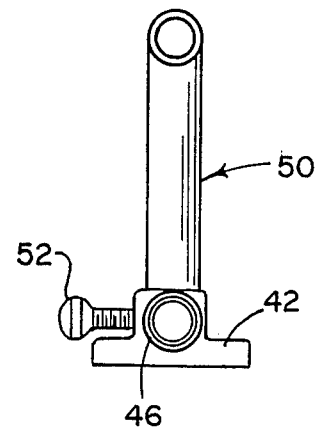
FIG. 5
FIG. 6
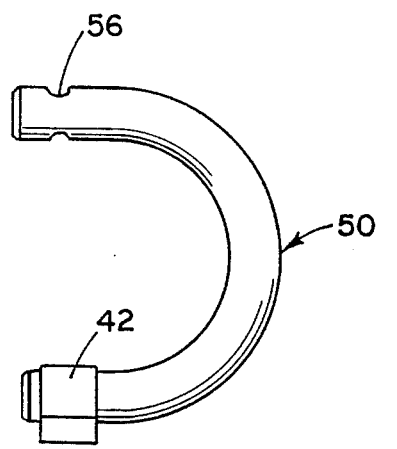
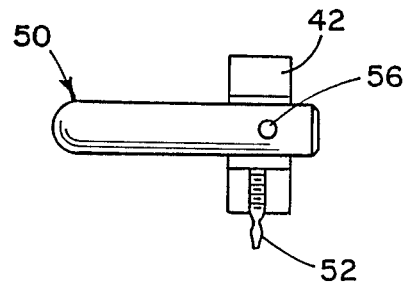
FIG. 7
FIG. 8

FISHING ROD HOLDER SUPPORT DEVICE

BACKGROUND OF THE INVENTION

1. Field of the Invention: This invention relates to support devices, in general, and fishing rod holder support devices, in particular.

2. Description of the Prior Art: In the past, it has been known to use fishing rod holder devices in order to support fishing rods. Such devices maintained support of a fishing rod during times when a fisherman chose to rest his hands and arms and also when the fisherman required his hands to be free to perform other activities. These devices typically consisted of supports ranging from natural materials such as branched twigs to rod-like man-made supports shaped from materials such as plastics or metals. A lower portion of these rod-like devices was typically inserted into a penetrable surface such as earth or sand and an upper portion supported the fishing rod.

A typical example of such a device is shown in my prior U.S. Design Pat. No. Des. 260,114. While such devices are satisfactory in the simple function of supporting a fishing rod atop a relatively easily-penetrated surface such as earth or sand, they are of virtually no use in ice fishing when one typically fishes directly atop a thick impenetrable ice surface. Furthermore, such devices are of no use when one wishes to fish from a boat.

A need has arisen, therefore, for a simple and reliable device which is able to stably support a fishing rod holder such as that disclosed in my prior U.S. Design Pat. No. Des. 260,114 on surfaces which heretofore could not stably sustain and support the position of such a rod-like fishing rod holder.

It is therefore an object of the present invention to provide structure for stably supporting and adapting a rod-like fishing rod holder to be for use in environments heretofore not capable of sustaining and supporting such a fishing rod holder.

It is a further object of the invention to construct a fishing rod holder support which is uncomplicated in design, and easily and inexpensively constructed.

Further objects and advantages of the invention will become apparent when one considers the detailed description of the invention presented hereinbelow.

SUMMARY OF THE INVENTION

In accordance with a first embodiment of the present invention, there is provided a support device for a fishing rod holder. The support device includes a base that is fixable to a surface, a member having a bore therethrough for receiving an end of a fishing rod holder, and structure for fixedly attaching the member to the base.

In accordance with a second embodiment of the present invention, which is similar in most aspects to the first embodiment mentioned above, there is further provided structure for adjustably attaching the fishing rod holder receiving member to the base.

BRIEF DESCRIPTION OF THE DRAWINGS

The invention may be better understood when considered in light of the accompanying drawings in which:

FIG. 1 is a side view in elevation of a conventional rod-like fishing rod holder which is receivable in the support device of the present invention;

FIG. 2 is a front view in elevation of the fishing rod holder shown in FIG. 1;

FIG. 3 is an exploded perspective view of a first embodiment of the fishing rod holder support device of the present invention which supports a rod-like fishing rod holder like that shown in FIG. 1 and FIG. 2;

FIG. 4 is a side view in elevation of the device of FIG. 3 in assembled condition;

FIG. 5 is an exploded perspective view of a second embodiment of the fishing rod holder support device of the present invention which supports a rod-like fishing rod holder like that shown in FIG. 1 and FIG. 2;

FIG. 6 is a side view of the device shown in FIG. 5 in assembled condition;

FIG. 7 is a rear view of the device shown in FIG. 5 in assembled condition;

FIG. 8 is a plan view of the device shown in FIG. 5 in assembled condition;

DESCRIPTION OF THE PREFERRED EMBODIMENT

Figure 9A:
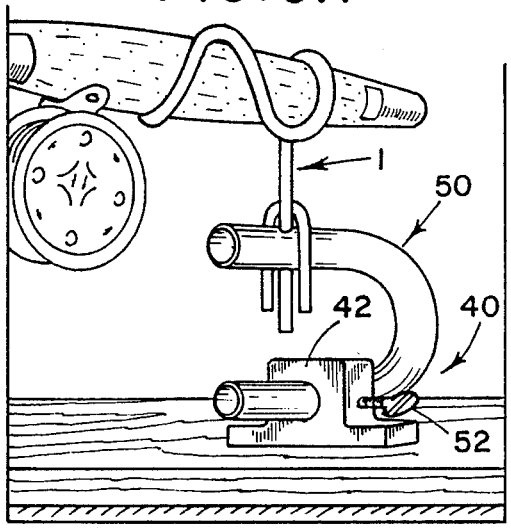
FIG. 9A illustrates the device shown in FIGS. 5-8 supporting a fishing rod holder like that shown in FIGS. 1 and 2 on a horizontal boat surface.
Figure 9B:
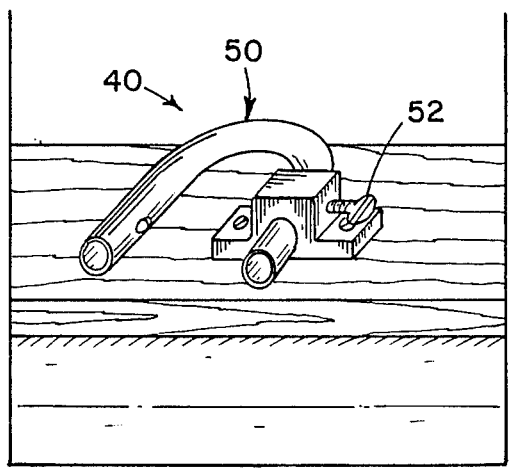
FIG. 9B illustrates the device shown in FIGS. 5-8 in a folded storage position on a horizontal boat surface.

Referring now to the illustrations of FIGS. 1 and 2, there is shown a rod-like fishing rod holder 1 of the type disclosed in my prior U.S. Design Pat. No. Des. 260,114. The fishing rod holder 1 is formed of a rod-like member having a central elongated shank portion 2, an upper fishing rod receiving portion 3, and a lower anchoring portion 4 which is normally inserted into a penetrable surface such as earth or sand. Secured to the shank portion 2 of the holder 1 near the lower portion 4 is a u-shaped, downwardly-directed stabilizing means 5 which limits lateral twisting of the holder 1 when the fishing rod holder is placed in the earth or sand. It should be noted that the fishing rod holder 1 shown in FIGS. 1 and 2 is merely illustrative of a typical rod-like fishing rod holder which may be used with the fishing rod holder of the present invention and does not, in and of itself, form a part of the present invention. It is also clear that other rod-like fishing rod holders having different configurations may be satisfactorily used with the fishing rod holder support device of the present invention.

FIGS. 3 and 4 illustrate a first embodiment of the present invention for use in stably supporting and adapting a rod-like fishing rod holder such as that shown in FIGS. 1 and 2 to be of use in ice fishing environments.

As depicted in FIGS. 3 and 4, there is shown a fishing rod holder support device 10 having a base 12 formed of elongated spaced apart support legs 14 and 16 which are joined together at first ends thereof at section 18. The support legs 14 and 16 preferably diverge outwardly from section 18 in order to distribute the forces applied against the base 12 over a large area of the ice surface upon which the support device 10 is affixed.

Secured to the forward most portion of section 18, as by welding for example, is a tubular member 20 having a bore 22 extending therethrough. The tubular member 20 receives through bore 22 the lower end of a rod-like fishing rod holder, such as lower portion 4 of fishing rod holder 1 shown in FIGS. 1 and 2. Tubular member 20 may be affixed to the base member 12 at a slight angle to the vertical, if desired.

At the rearward ends of support legs 14 and 16 are downwardly directed foot means 24, 26 which further stabilize the support device against forces applied to the legs 14 and 16 of base 12.

A washer 28 is welded to section 18 of base 12 immediately rearward of tubular member 20. Washer 28 receives a pointed stake 30 therethrough for affixing the support device 10 onto an ice surface (not shown). The stake 30 is inserted into the ice by a fisherman who grasps handle 32 and hammer or otherwise pounds the stake into the ice to a point at which collar 34, which is secured to stake 30, abuts washer 28. Depending on the ice thickness, the stake may be either embedded into or completely penetrate through the ice. Furthermore, when pounding the stake through the ice, a reasonably accurate determination of ice thickness may be obtained by detecting the degree of resistance to penetration of the stake as it is driven into the ice. For example, ice thickness may be determined, so long as it is less than the distance between the point of the stake and collar 34, by observing the length of the stake which encounters resistance to penetration as it enters the ice. The depth at which the stake begins to slide easily into the ice without pounding indicates complete penetration and thus the thickness of the ice.

As one can readily see, the fishing rod holder support device 10, when properly staked into the ice, is in a condition to receive the lower end of a rod-like fishing rod holder such as that shown in FIGS. 1 and 2, for example. A fisherman merely inserts the lower end of a typical rod-like fishing rod holder into and completely through tubular member 20 until the lower end of the fishing rod holder rests on the ice surface. In such a condition, the support device 10 provides a simple, inexpensive and durable device for stably supporting and adapting a conventional rod-like fishing rod holder to be of use on impenetrable ice surfaces.

FIGS. 5 through 8 illustrate a second embodiment of the present invention for use in stably supporting and adapting a rod-like fishing rod holder such as that shown in FIGS. 1 and 2 to be of use on boat surfaces.

As depicted in FIGS. 5 through 8, there is shown a fishing rod holder support device 40 having a base 42 formed of an upstanding portion interposed between flange members. The flange members are provided with bores 44 for receiving attachment means for securing the base 42 to a surface of a boat. The attachment means may typically comprise screws, bolts, nails, rivets, and the like.

The base 42 is thus mountable to horizontal, vertical, or inclined boat surfaces to thereby provide universal mounting orientations for the fishing rod holder support device 40 on a boat structure. The boat surfaces to which the base 42 may be mounted further include inner and/or outer walls of a boat.

The upstanding portion of base 42 has formed therein a hole 46 for receiving a substantially U-Shape bent tubular member 50. Tubular member 50 may be inserted through hole 46 from either end thereof. And, as most clearly illustrated in FIGS. 9A, 9C and 9E, hole 46 is of sufficient diameter to permit the entire length (i.e., both the linear portions and the curved portion) of tubular member 50 to be passed therethrough. A set screw 52, which is threaded laterally into the upstanding portion of the base 42, acts to lock the tubular member 50 in any of a multitude of positions relative to base 42. Near one end of tubular member 50 there is provided a bore 56 which extends diametrically through the tubular walls of tubular member 50. Bore 56 is provided to receive the lower end of a rod-like fishing rod holder such as that shown in FIGS. 1 and 2.

Figure 9C:
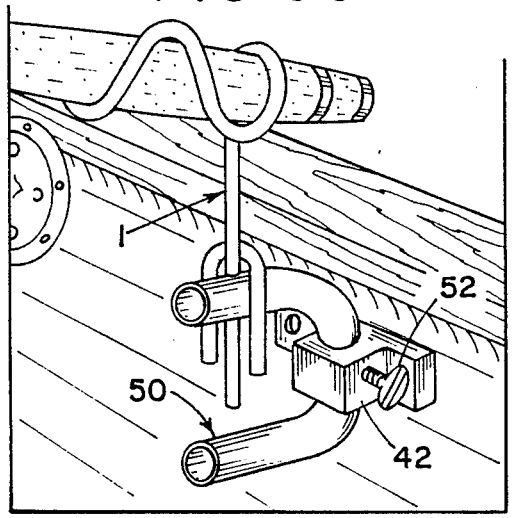
FIG. 9C illustrates the device shown in FIGS. 5-8 supporting a fishing rod holder like that shown in FIGS. 1 and 2 on a substantially vertical outer boat wall surface.
Figure 9D:
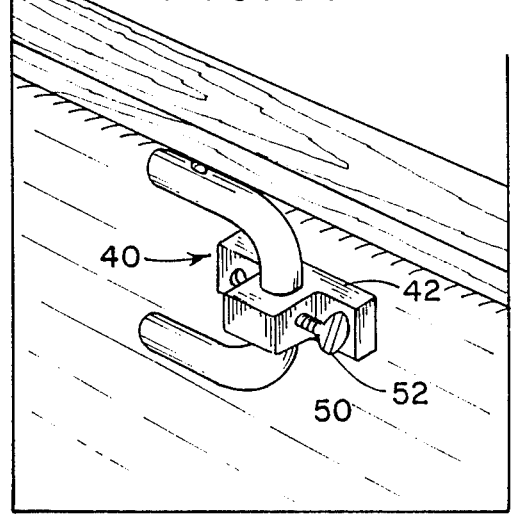
FIG. 9D illustrates the device shown in FIGS. 5-8 in a folded storage position against a substantially vertical outer boat wall surface.
Figure 9E:
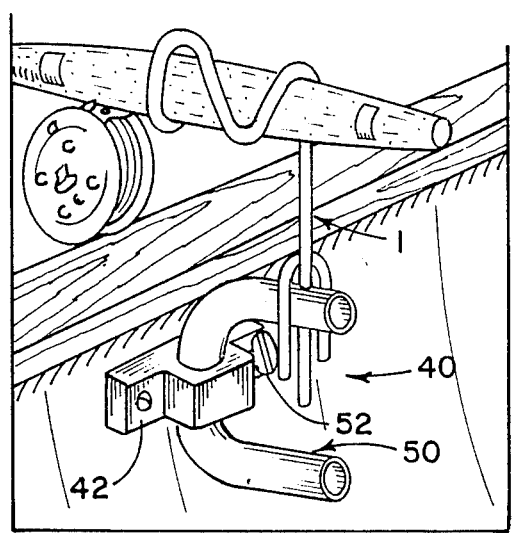
FIG. 9E illustrates the device shown in FIGS. 5-8 supporting a fishing rod holder like that shown in FIGS. 1 and 2 on a substantially vertical inner boat wall surface.
Figure 9F:
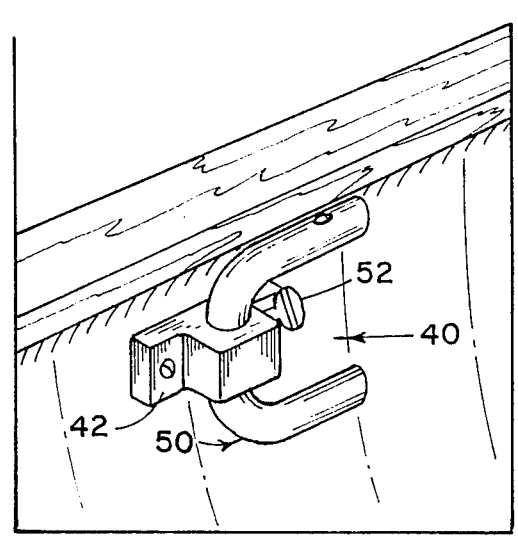
FIG. 9F illustrates the device shown in FIGS. 5-8 in a folded storage position against a substantially vertical inner boat wall surface.

As can be readily seen in FIGS. 9A, 9C and 9E, when a fisherman desires to use a fishing rod holder having the configuration of that shown in FIGS. 1 and 2 with the fishing rod holder support devise 40 of the present invention, the fisherman merely inserts the lower portion 4 of fishing rod holder 1 into and through bore 56 until stabilizing means 5 abuts and straddles tubular member 50. The straddling of stabilizing means 5 about tubular member 50 limits twisting or rotation of fishing rod holder 1 in fishing rod holder support device 40.

It is also contemplated that a fisherman may use support device 40 to support a rod-like fishing rod holder of simpler configuration than that shown in FIGS. 1 and 2. Such a simpler rod-like fishing rod holder may not be provided with any stabilizing means. In such case, a fisherman would merely insert the lower end of the simpler rod-like fishing rod holder into and completely through bore 56 in tubular member 50. The lower end of the fishing rod holder will then come to rest on either the upstanding portion of the base 42 or on the opposite end of tubular member 50, depending on the depth to which the tubular member 50, is inserted in hole 46 provided in the upstanding portion of base 42.

Obviously such a simpler rod-like fishing rod holder may be used with the support device 40 of the present invention. However, lacking stabilizing means such as those designated by numeral 5 in FIGS. 1 and 2, such a simpler rod-like fishing rod holder would be subject to undesirable rotation or twisting within bore 56.

Regardless of the specific rod-like fishing rod holder which is chosen for use with support device 40, the angular position of tubular member 50 is, of course, universally adjustable relative to base 42 by selectively angularly moving tubular member 50 through hole 46 in base 42 and tightening set screw 52 to lock tubular member 50 in any of a multitude of positions relative to base 42.

The fishing rod holder support device 40 as illustrated in FIGS. 5–8 and 9A–9F provides a simple, inexpensive and durable apparatus for stably supporting and adapting a conventional rod-like fishing rod holder to be mounted for universal orientations on a boat structure. The universal mounting orientations of the fishing rod holder are provided by:

(1) a fishing rod holder support device 40 having a base 42 which can be mounted to any horizontal, vertical, or inclined boat surface; regardless if such surface is an inner or outer boat surface; (2) a bent tubular fishing rod holder receiving member 50 which may be reversibly and completely inserted through a hole 46 provided in the base 42; and (3) the tubular member 50 being capable of adjustment to a multitude of angular positions relative to base 42 by selectively loosening set screw 52 provided in base 42, angularly adjusting tubular member 50 in hole 46 of base 42, and then retightening set screw 52.

While the invention has been described in connection with preferred embodiments of the various figures, it is to be understood that other similar embodiments may be used or modifications or additions may be made to the described embodiment for performing the same functions of the present invention without deviating therefrom. Therefore, the present invention should not be limited to any single embodiment, but rather construed in breadth and scope in accordance with the recitation of the appended claims.

I claim:

1. The system of a fishing rod holder and support apparatus therefore, said system comprising:
    a rod-like fishing rod holder having first and second end portions, said first end portion including means for receiving and holding a fishing rod above a relatively penetrable ground surface when said second end portion is inserted thereinto;
    base means for supporting said fishing rod holder on a relatively impenetrable support surface;
    means for affixing said base means to said support surface;
    a member having a bore therethrough for removably receiving said second end portion of said fishing rod holder, said member including a plurality of portions bent relative to one another, each of said plurality of portions being engageable by said means for attaching; and
    means for attaching said member to said base means,
    whereby said rod-like fishing rod holder, normally possessing utility only when said second end portion thereof is inserted into said relatively penetrable ground surface, is adaptable for use on said relatively impenetrable support surface when said second end portion thereof is received in said member and said means for affixing affixes said base means to said support surface.

2. The system of claim 1, wherein said member is universally adjustably attached to said base, whereby said member provides stable support for said fishing rod holder in any of a multitude of orientations of said member relative to said base means.

3. The system of claim 2, wherein said means for attaching said member to said base means comprises set screw means for locking said member in any of a multitude of orientations relative to said base means.

4. The system of claim 1 wherein said support surface is a boat surface.

5. The system of claim 1 wherein said means for affixing is separate from said base means.

6. The system of claim 5 wherein said means for affixing removably affixes said base means to said support surface.

7. The system claim 6 wherein said means for affixing comprises mechanical fastening means.

8. The system of claim 1 wherein said plurality of portions includes at least one curved portion.

9. The system of claim 8 wherein said plurality of portions further includes at least one linear portion.

10. The system of claim 9 wherein said member is substantially U-shaped.

11. The system of claim 10 wherein said bore extends diametrically through said member.

12. The system of claim 11 wherein said member is tubular.

13. The system of a fishing rod holder and support apparatus therefore, said system comprising:
    a rod-like fishing rod holder having first and second end portions, said first end portion including means for receiving and holding a fishing rod above a relatively penetrable ground surface when said second end portion is inserted thereinto;
    base means for supporting said fishing rod holder on a relatively impenetrable frozen support surface, said base means comprising a plurality of spaced apart legs and means for joining said legs;
    means for affixing said base means to said support surface;
    a member having a bore therethrough for removably receiving said second end portion of said fishing rod holder; and
    means for attaching said member to said base means,
    whereby said rod-like fishing rod holder, normally possessing utility only when said second end portion thereof is inserted into said relatively penetrable ground surface, is adaptable for use on said relatively impenetrable frozen support surface when said second end portion thereof is received in said member and said means for affixing affixes said base means to said support surface.

14. The system of claim 13 wherein said plurality of legs include a pair of legs joined together at first ends thereof.

15. The system of claim 14 wherein said member is fixedly attached to said legs at a location adjacent said first ends thereof.

16. The system of claim 15 wherein each of said pair of legs includes a downwardly directed foot at a second end thereof, whereby said means for affixing, said legs, and said feet provide stable and substantially stationary support for said fishing rod holder when said holder is received in said member and said base means is affixed to said frozen surface.

17. The system of claim 16 wherein said means for affixing include anchor means, said anchor means being separate from said base means and insertable through said base means for affixing said base means to said surface.

* * * * *